No. 861,069. PATENTED JULY 23, 1907.
G. H. WOOD.
TRANSMISSION MECHANISM.
APPLICATION FILED MAR. 7, 1907.

2 SHEETS—SHEET 2.

WITNESSES

INVENTOR
George H. Wood
BY Munn & Co
ATTORNEYS

UNITED STATES PATENT OFFICE.

GEORGE HENRY WOOD, OF GLEN COVE, NEW YORK.

TRANSMISSION MECHANISM.

No. 861,069.　　　　　Specification of Letters Patent.　　　　Patented July 23, 1907.

Application filed March 7, 1907. Serial No. 361,035.

*To all whom it may concern:*

Be it known that I, GEORGE HENRY WOOD, a citizen of the United States, and a resident of Glen Cove, in the county of Nassau and State of New York, have invented a new and Improved Transmission Mechanism, of which the following is a full, clear, and exact description.

This invention relates to transmission mechanism, and is especially useful in driving machinery at different speeds.

The invention is especially applicable in the driving mechanism of vehicles, motor boats, and under similar conditions where the machinery must have a wide range of speeds.

The object of the invention is to produce a transmission mechanism of simple construction, and which can be quickly controlled so as to change the speed as desired.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
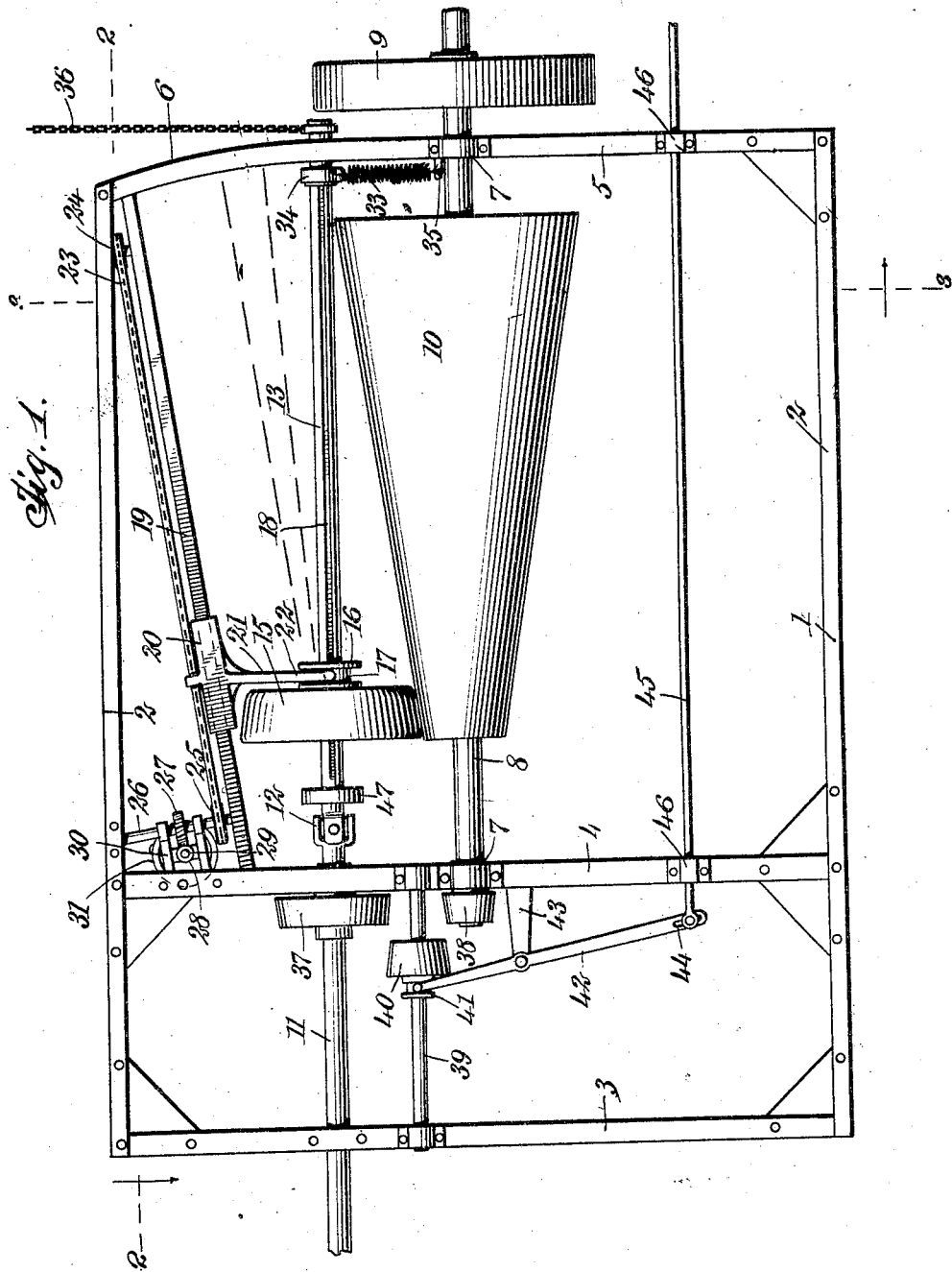
Figure 2:
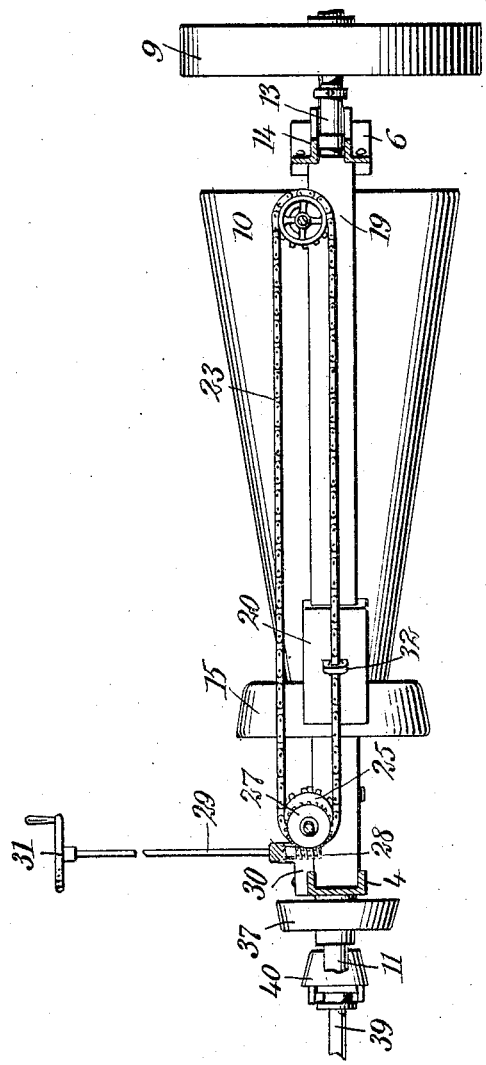
Figure 3:
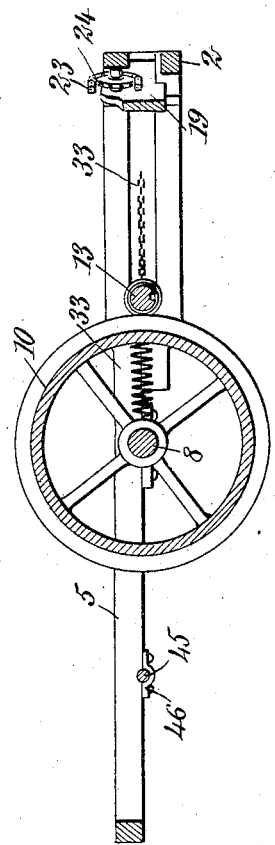

Figure 1 is a bottom plan of the mechanism constructed according to my invention; Fig. 2 is a vertical section on the line 2—2 of Fig. 1; and Fig. 3 is a section on the line 3—3 of Fig. 1.

Referring more particularly to the parts, 1 represents a frame of substantially rectangular form, presenting oppositely disposed longitudinal beams 2 connected by a pair of transverse beams 3 and 4. The beam 3 is disposed at the forward end of the frame 1 and the beam 5 is disposed at the opposite end. The beam 5 is substantially straight except at one end where it is formed into a curve or arc 6, for a purpose which will appear more fully hereinafter.

Rotatably mounted in suitable bearings 7 on the beams 4 and 5, I provide a main shaft or driving shaft 8, which is adapted to be continuously driven by the engine or motor. At a suitable point this shaft is provided with a fly-wheel 9, and between the beams 4 and 5 it is provided with an elongated conical pulley 10.

Rotatably mounted in bearings on the beams 3 and 4, I provide a driven shaft 11; the body of this shaft extends toward the left from the beam 3, and the other end of this shaft extends a short distance to the right of the beam 4 where it is connected by a universal joint 12 with a swinging shaft 13. The beam 5 at the curve 6 is formed of two curved bars 14, as indicated in Fig. 2, and these bars lie a short distance apart so as to form a guide for the end of the shaft 13 which lies between the bars. On this swinging shaft 13 there is slidably mounted a driven pulley 15, the face whereof is adapted to rest against the face of the cone 10, as indicated. This pulley is provided with a shifting collar 16 formed with a circumferential groove 17. The pulley 15 is slidably connected with the shaft 13 through the medium of a key in the pulley engaging a key-seat 18 which enables the pulley to rotate the shaft when the pulley is rotated from the cone. It should be understood that the curve 6 of the beam 5 constitutes a guide for the free end of the shaft 13, and this part is curved about the universal joint 12 as a center.

Rigidly mounted in the frame on the side of the pulley 15 which is remote from the cone 10, I provide an inclined guide bar 19 which is disposed substantially parallel with the adjacent face of the cone, as indicated. On this guide bar 19 there is slidably mounted a slide or block 20, which block is formed with an arm 21 which projects toward the shaft 13 and is formed into a yoke 22 at its extremity, and this yoke engages the groove 17 of the collar 16, as shown in Fig. 1.

On the outer side of the guide bar 19 an endless chain 23 is mounted upon pulleys 24 and 25. The pulley 25 is carried upon a shaft 26 provided with a worm wheel 27, and this worm wheel is driven by a worm 28 carried upon a vertical spindle 29 which passes downwardly through the frame, being suitably mounted in a bracket 30. At its upper end the spindle 29 is provided with a hand wheel 31 which enables the shaft 26 to be rotated as desired. One side of the chain 23 is attached to the slide 20, for which purpose the slide is provided with a laterally projecting ear 32 as shown in Fig. 2. From this arrangement it should be understood that if the hand wheel 31 is rotated so as to advance the slide 20 toward the right, as viewed in Fig. 1, the pulley 15 will be advanced toward the large end of the cone, and at the same time the swinging shaft 13 will swing inwardly toward the dotted lines shown in Fig. 1. The pulley 15 is maintained in contact with the face of the cone 10 by means of a helical spring 33 which is attached to a fixed collar 34 on the shaft 13 near the beam 5; the inner end of the spring being attached to a suitable bracket 35 attached near the shaft 8 on the frame. The small diameter of the cone 10 is less than that of the pulley 15, while the large diameter is greater, from which it follows that the shaft 11 may be driven at a slower speed or a higher speed than that of the shaft 8. In the position shown in Fig. 1, the shaft 11 will be driven at a slower speed. If the pulley 15 is advanced toward the other end of the cone, the speed of the shaft 11 will, of course, gradually increase until it reaches a maximum, when the pulley 15 is at the largest diameter of the cone.

In order to enable the transmission mechanism to be suddenly thrown out in case of an accident, I provide a chain 36 which is attached to the free end of the shaft 13; if this chain be pulled away from the shaft 8, the shaft 13 will be swung outwardly so as to disengage the pulley 15 from the cone. I provide means whereby the shaft 8 may drive the driven shaft 11 in a reverse direction at a reduced speed. For this purpose the shaft 11 is provided with a reversing pulley 37, and a corresponding reversing pulley 38 is provided on the extremity of the shaft 8, which is extended beyond the beam 4 so as to bring the pulley 38 opposite the pulley 37, as illustrated in Fig. 1. Between these pulleys a shaft 39 is supported on the beams 3 and 4, and on this shaft there is slidably mounted a pulley 40 which is adapted to slide into position between the pulleys 37 and 38, constituting an idler to connect them and give the pulley 37 a reverse movement. The pulleys 37 and 38 are slightly conical, the small ends thereof being disposed toward the direction from which the pulley 40 advances when being introduced between them. In order to shift the idler pulley 40, the same is provided with a shifting collar 41 which is engaged by the end of a shifting lever 42, said shifting lever being pivotally mounted on a suitable bracket 43 and having a slot 44 formed at its free end to which is connected a shifting rod 45. This shifting rod is mounted longitudinally in suitable brackets 46 attached to the beams 4 and 5 as shown. From this arrangement evidently, when the pulley 15 is out of contact with the cone 10, the driven shaft 11 may be reversed and driven at a low speed. In order to enable the pulley 15 to be thrown out of engagement with the cone 10 without resorting to the chain 36, the universal joint 12 is located at some distance beyond the end of the cone and adjacent to the univeral joint, a stop collar 47 is provided. If the pulley 15 is moved up to this collar 47, its face will be beyond the end of the cone so that it is thrown out of contact therewith, as will be readily understood.

Having thus described my invention, I claim as new and desire to secure by Letters Patent:

1. In transmission mechanism, in combination, a driving shaft, a cone carried thereby, a driven shaft, a swinging shaft having a universal connection with said driven shaft, a pulley slidably mounted on said swinging shaft, adapted to engage said cone and affording means for rotating said swinging shaft, means for advancing said pulley on said swinging shaft, and means for holding said pulley in contact with said cone.

2. In mechanism of the class described, in combination, a driving shaft, a cone mounted thereon, a driven shaft, a swinging shaft having a universal connection with said driven shaft, a pulley slidably mounted on said swinging shaft and adapted to rotate the same, a spring pulling said swinging shaft toward said cone and holding the face of said pulley against said cone, and means for advancing said pulley along said swinging shaft.

3. In transmission mechanism, in combination, a frame, a driving shaft rotatably mounted therein, a cone carried by said driving shaft, a driven shaft, a swinging shaft having a universal connection with said driven shaft, a pulley mounted to slide on said swinging shaft, adapted to engage said cone and affording means for rotating said swinging shaft, an inclined guide bar, a slide mounted on said guide bar, connected with said pulley and affording means for advancing said pulley on said swinging shaft, and means for advancing said slide on said guide bar.

4. In transmission mechanism, in combination, a frame, a driving shaft rotatably mounted therein, a cone carried by said driving shaft, a driven shaft, a swinging shaft having a universal connection with said driven shaft, a pulley mounted to slide on said swinging shaft, adapted to engage said cone and affording means for rotating said swinging shaft, an inclined guide bar, a slide mounted on said guide bar, connected with said pulley and affording means for advancing said pulley on said swinging shaft, means for advancing said slide on said guide bar, and means for pressing said swinging shaft toward said cone to maintain said pulley in contact with the face of said cone.

5. In transmission mechanism, in combination, a frame, a driving shaft rotatably mounted therein, a cone carried by said driving shaft, a driven shaft rotatably mounted in said frame, a swinging shaft having a universal connection with said driven shaft, a pulley slidably mounted on said swinging shaft, adapted to rotate said swinging shaft and engaging the face of said cone, a spring pulling said swinging shaft toward said cone and holding said pulley against said cone, an inclined guide bar, a slide moving thereupon and having a yoke, said pulley having a collar engaging said yoke whereby said slide may advance said pulley on said swinging shaft, a chain extending longitudinally of said guide bar and attached to said slide for advancing the same, and means for advancing said chain.

6. In transmission mechanism, in combination, a frame, a driving shaft rotatably mounted in said frame, a cone mounted on said shaft, a driven shaft mounted in said frame, a swinging shaft having a universal connection with said driven shaft, means for guiding the free end of said swinging shaft on said frame, a pulley sliding on said swinging shaft, adapted to rotate the same and engaging the face of said cone, means for pressing said swinging shaft toward said cone to maintain said pulley in contact with said cone, and means for advancing said pulley on said swinging shaft.

7. In mechanism of the class described, in combination, a frame, a driving shaft rotatably mounted therein and a conical pulley mounted thereupon, a driven shaft a conical pulley mounted thereupon opposite said first pulley, said pulleys being arranged with the small ends thereof disposed opposite, means for normally driving said driven shaft from said driving shaft in a forward direction, and a sliding pulley adapted to move into position between said first pulleys and affording means for reversing the movement of said driven shaft.

8. In transmission mechanism, in combination, a frame, a driving shaft rotatably mounted therein, a cone carried by said shaft, a driven shaft, a swinging shaft having a universal connection with said driven shaft, a pulley sliding on said swinging shaft, affording means for rotating said swinging shaft and normally engaging the face of said cone, means for advancing said pulley on said swinging shaft, a spring pulling said swinging shaft toward said cone so as to maintain said pulley in contact with the face of said cone, and means for forcing said swinging shaft away from said cone to disengage said pulley from said cone.

9. In mechanism of the class described, in combination, a frame, a driving shaft rotatably mounted therein, a cone carried by said driving shaft, a driven shaft, a swinging shaft having a universal connection with said driven shaft, a pulley sliding on said swinging shaft, affording means for rotating the same and normally engaging the face of said cone, an inclined guide bar, a slide mounted on said guide bar and having a yoke, said pulley having a collar engaged by said yoke whereby said slide may advance said pulley on said swinging shaft, means for advancing said slide, means for normally pressing said swinging shaft toward said cone to maintain said pulley in contact with the face of said cone, and means for forcing said swinging shaft away from said cone to disengage said pulley therefrom.

In testimony whereof I have signed my name to this specification in the presence of two subscribing witnesses.

GEORGE HENRY WOOD.

Witnesses:
  MICHEAL J. DONOHUE,
  EDWARD F. WOOD.